3,576,022
ORGANOSILICON COMPOUNDS
Richard P. Bush, Penarth, Glamorgan, and Christopher
A. Pearce, Cowbridge, Glamorgan, Wales, assignors to
Midland Silicones Limited, Reading, England
No Drawing. Filed Oct. 3, 1968, Ser. No. 764,926
Claims priority, application Great Britain, Oct. 5, 1967,
45,560/67
Int. Cl. C07f 7/02
U.S. Cl. 260—448.2                                    5 Claims

ABSTRACT OF THE DISCLOSURE

Silazane endblock siloxanes of the formula $$[(R_3Si)_2NSiR'_2OSiR''_2]_2O$$

where R, R' and R'' are defined organic radicals and R can also be hydrogen.

---

This invention relates to novel oragnosiloxanes wherein each of the terminal silicon atoms has attached thereto a bis(triorganosilyl)-amino group. The invention also relates to a process for the preparation of such siloxanes.

The novel organosiloxanes of this invention are those having the general formula $[(R_3Si)_2NSiR'_2OSiR''_2]_2O$ wherein each R represents a hydrogen atom, an alkyl or alkenyl radical containing less than 6 carbon atoms or a monocyclic aryl radical, not more than two R groups attached to any silicon atom being hydrogen atoms, each R' represents an alkyl or alkenyl radical containing less than 6 carbon atoms or a monocyclic aryl radical and R'' represents a monovalent hydrocarbon radical.

In the general formula R and R' can represent, for example, methyl, ethyl, propyl, vinyl, allyl, phenyl, p-tolyl, p-xylyl and nitrophenyl radicals. R can also represent a hydrogen atom except that not more than two R groups attached to any one silicon atom can be hydrogen. Each R'' represents a monovalent hydrocarbon radical, for example, an alkyl radical such as the methyl, ethyl or butyl radical, an alkenyl radical such as vinyl or allyl or an aromatic hydrocarbon radical such as the phenyl, xenyl or tolyl radical. Each of the R, R' and R'' can be the same or different and are preferably selected from the lower alkyl radicals, most preferably methyl or ethyl radicals.

The organosiloxanes of this invention can be prepared by reacting a compound of the general Formula 1 $(R_3Si)_2NSiR'_2OSiR''_2OH$ with a compound of the Formula 2 $(R_3Si)_2NSiR'_2OSiR''_2Y$ wherein R, R' and R'' have the significance of hereinbefore ascribed and each Y represents an amino group of the formula $-NX_2$ wherein each X represents a hydrogen atom, an alkyl radical or a phenyl radical. Specific examples of Y groups are $-NH_2$, $-NH(C_2H_5)$, $-N(C_2H_5)_2$, $-NH(C_4H_9)$ and $-N(C_6H_5)_2$. The process is novel and is included within the scope of this invention.

The reactants defined by the general Formulas 1 and 2 can be prepared as described in our co-pending United States patent application Ser. No. 761,814, filed Sept. 23, 1968.

If desired, the reactants can be prepared separately and thereafter mixed and reacted. An alternative and more convenient method of preparation, however, comprises subjecting the compound (2) to controlled hydrolysis under conditions wherein the compound (2) and its hydrolysis product $(R_3Si)_2NSiR'_2OSiR''OH$, that is, compound (1), co-exist for sufficient time for the desired reaction to take place. When employing this method of preparation therefore, it is desirable that compound (2) should not be converted to its silanol derivative too rapidly. In this connection we have found that a convenient rate of hydrolysis can be obtained when each X in the group $-NX_2$ is the ethyl or propyl radical.

Reaction between the silanol or siloxanol (1) and the aminosilicon compound (2) can be catalyzed by the presence of an acidic catalyst. The presence of such a catalyst facilitates the reaction and significantly reduces the overall reaction time. Examples of acidic catalysts which can be employed for this purpose are chlorosilanes, sulphuric acid, hydrochloric acid, acetic acid and acid salts of organic amines and ammonia, e.g., ammonium sulphate.

Heat can be applied to the reaction mixture to hasten the hydrolysis of the amino compound (2) or to promote the reaction between compounds (1) and (2). Preferably, the reaction is carried out at a temperature within the range from 30° to 100° C. although higher or lower temperatures can be used.

If desired, the reaction between compounds (1) and (2) can be carried forward in the presence of organic solvents. Any solvent for the reactants which is inert under the reaction conditions can be used, although water-miscible solvents such as 1,2-dimethoxyethane are preferably employed when the preparative route includes the hydrolysis technique hereinbefore described.

The compounds of this invention are useful as water repellents and as defoaming agents.

The following example illustrates the invention.

EXAMPLE

1 - bis(trimethylsilyl)amino - 1,1,3,3-tetramethyl-3-diethylaminodisiloxane $$(CH_3Si)_2NSi(CH_3)_2OSi(CH_3)_2N(C_2H_5)_2$$

(30.4 g., 1 mol) and water 1.7 g., 1 mol) were added separately to 1,2-dimethoxyethane, the mixture stirred and allowed to stand at room temperature for 20 hours. The solution was then raised to reflux temperature for a further 2 hours after which time hydrolysis of the organosiloxane was shown, by vapor phase chromatographic analysis, to have taken place. Volatile materials were removed from the reaction mixture by distillation at 20°/1 mm. Hg and further distillation yielded 1,7-bis[(trimethylsilylamino] - 1,1,3,3,5,5,7,7 - octamethyltetrasiloxane (9.5 g., 38%) B.P. 126–7°/0.5 mm.

That which is claimed is:
1. Organosiloxanes of the general formula $$\{(R_3Si)_2NSiR'_2OSiR''_2\}_2O$$

wherein each R represents a hydrogen atom, an alkyl or alkenyl radical containing less than 6 carbon atoms or a monocyclic aryl radical, not more than two R groups attached to any silicon atom being hydrogen atoms, each R' and each R'' represents an alkyl or alkenyl radical containing less than 6 carbon atoms or a monocyclic aryl radical.

2. Organosiloxanes as claimed in claim 1 wherein each of the R, R' and R'' are selected from methyl radicals and ethyl radicals.

3. 1,7-bis[bis(trimethylsilyl)amino]-1,1,3,3,5,5,7,7-octamethyltetrasiloxane.

4. A process for the preparation of an organosiloxane of the general formula $[(R_3Si)_2NSiR'_2OSiR''_2]_2O$ which comprises reacting (1) a compound of the general formula $(R_3Si)_2NSiR'_2OSiR''_2OH$ with (2) a compound of the general formula $(R_3Si)_2NSiR'_2OSiR''_2Y$, wherein in the general formulae R, R' and R" are as defined in claim 1 and Y represents an amino group of formula $-NX_2$ wherein each X represents a hydrogen atom, an alkyl radical containing 1 to 4 carbon atoms or a phenyl radical.

5. A process as claimed in claim 4 wherein reactant (1) is produced in situ in the reaction mixture by the controlled hydrolysis of reactant (2).

References Cited

UNITED STATES PATENTS 3,253,008   5/1966   Fink _____ 260—448.2

JAMES E. POER, Primary Examiner
W. F. W. BELLAMY, Assistant Examiner

U.S. Cl. X.R.

260—448.2